United States Patent
Boman

(10) Patent No.: US 8,002,168 B2
(45) Date of Patent: Aug. 23, 2011

(54) METHOD OF PRODUCING AN ENGINE WALL STRUCTURE

(75) Inventor: Arne Boman, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 833 days.

(21) Appl. No.: 12/063,827

(22) PCT Filed: Sep. 6, 2005

(86) PCT No.: PCT/SE2005/001294
§ 371 (c)(1),
(2), (4) Date: Feb. 14, 2008

(87) PCT Pub. No.: WO2007/030039
PCT Pub. Date: Mar. 15, 2007

(65) Prior Publication Data
US 2008/0216315 A1  Sep. 11, 2008

(51) Int. Cl.
*B23K 31/02* (2006.01)
*B21K 3/00* (2006.01)
(52) U.S. Cl. ........... 228/165; 228/172; 29/888.01
(58) Field of Classification Search ........... None
See application file for complete search history.

(56) References Cited

U.S. PATENT DOCUMENTS

| | | | | |
|---|---|---|---|---|
| 2,669,835 A | * | 2/1954 | Rossheim et al. | 60/260 |
| 2,968,918 A | * | 1/1961 | Denison, Jr. | 60/260 |
| 3,246,469 A | * | 4/1966 | Moore | 60/265 |
| 3,501,916 A | * | 3/1970 | Dederra et al. | 60/267 |
| 3,595,025 A | * | 7/1971 | Stockel et al. | 60/267 |
| 3,692,637 A | * | 9/1972 | Dederra et al. | 205/114 |
| 3,780,533 A | * | 12/1973 | Huang | 60/260 |
| 3,910,039 A | * | 10/1975 | Fortini | 60/265 |
| 4,028,198 A | * | 6/1977 | Tuscher et al. | 205/73 |
| 4,156,306 A | * | 5/1979 | Seidel et al. | 29/423 |
| 4,582,678 A | * | 4/1986 | Niino et al. | 419/8 |
| 4,591,534 A | * | 5/1986 | Wagner et al. | 428/593 |
| 4,852,232 A | * | 8/1989 | Wells | 219/69.12 |
| 5,051,559 A | * | 9/1991 | Wells | 219/121.72 |
| 5,075,966 A | * | 12/1991 | Mantkowski | 29/890.01 |
| 5,154,352 A | * | 10/1992 | Buckreus | 239/127.1 |
| 5,233,755 A | * | 8/1993 | Vandendriessche | 29/890.01 |
| 5,249,357 A | * | 10/1993 | Holmes et al. | 29/890.01 |

(Continued)

FOREIGN PATENT DOCUMENTS

EP 1316772 A1 6/2003

OTHER PUBLICATIONS

International Search Report for corresponding International Application PCT/SE2005/001294.

*Primary Examiner* — Kiley Stoner
(74) *Attorney, Agent, or Firm* — WRB-IP LLP

(57) ABSTRACT

A method is provided for producing an engine wall structure that includes an inner wall, to which hot gas is admitted during engine operation, an outer wall, which is colder than the inner wall during engine operation, and at least two webs that connect the inner wall with the outer wall and delimit a cooling duct between the walls. The engine wall structure is produced by wire-electro discharge machining the duct out of a solid sheet forming the entire engine wall structure including the inner wall, the outer wall and the webs.

18 Claims, 3 Drawing Sheets

U.S. PATENT DOCUMENTS

| | | | | |
|---|---|---|---|---|
| 5,418,345 A * | 5/1995 | Adamski | ................... | 219/69.17 |
| 5,501,011 A * | 3/1996 | Pellet | ........................ | 29/890.01 |
| 5,688,104 A * | 11/1997 | Beabout | ....................... | 415/115 |
| 5,864,949 A * | 2/1999 | Kildea | ........................ | 29/889.7 |
| 5,899,060 A * | 5/1999 | Schmidt | ........................ | 60/267 |
| 5,957,657 A * | 9/1999 | Akita et al. | ................... | 415/115 |
| 6,138,451 A * | 10/2000 | Kreiner et al. | ................... | 60/258 |
| 6,209,199 B1 * | 4/2001 | Cornu et al. | ............... | 29/890.01 |
| 6,516,872 B1 * | 2/2003 | Cornu et al. | ................... | 165/133 |
| 6,591,499 B1 | 7/2003 | Lundgren | | |
| 6,850,874 B1 * | 2/2005 | Higuerey et al. | ................. | 703/4 |
| 2003/0175453 A1 * | 9/2003 | Steffier | ........................ | 428/34.5 |
| 2003/0183606 A1 * | 10/2003 | Lundgren | ................ | 219/121.63 |
| 2004/0103639 A1 * | 6/2004 | Hagganger | ................ | 60/267 |
| 2004/0107692 A1 * | 6/2004 | Horn et al. | ..................... | 60/258 |
| 2004/0222571 A1 * | 11/2004 | Steffier | ........................ | 264/602 |
| 2005/0135923 A1 * | 6/2005 | Coons et al. | .................. | 415/115 |
| 2005/0188678 A1 * | 9/2005 | Hagganger | .................... | 60/266 |
| 2005/0286998 A1 * | 12/2005 | Lee et al. | ....................... | 415/117 |
| 2007/0012370 A1 * | 1/2007 | Christensen et al. | ......... | 137/829 |
| 2007/0022741 A1 * | 2/2007 | Frobhlich | ....................... | 60/257 |
| 2007/0031252 A1 * | 2/2007 | Walters et al. | .............. | 416/97 R |
| 2008/0072852 A1 * | 3/2008 | Thomas | ................ | 123/41.82 R |

* cited by examiner

METHOD OF PRODUCING AN ENGINE WALL STRUCTURE

BACKGROUND AND SUMMARY

The present invention relates to a method of producing an engine wall structure that comprises an inner wall, to which hot gas is admitted during engine operation, an outer wall, which is colder than the inner wall during engine operation, and at least two webs that connect the inner wall with the outer wall and delimit a cooling duct between said walls.

During engine operation, any cooling medium may flow through the ducts. However, in particular, the invention relates to engine wall structures and a process for manufacturing engine wall structures in which there is a plurality of such webs dividing the space between the walls into a plurality of ducts, in particular for cooling the firing chamber walls and the thrust nozzle walls of rocket engines driven with hydrogen as a fuel or hydrocarbon, i.e. kerosene, wherein the fuel is introduced in the cold state into the wall structure, is delivered through the cooling ducts while absorbing heat via the inner wall, and is subsequently used to generate the thrust. Heat is transferred from the hot gases to the inner wall, further on to the fuel, from the fuel to the outer wall, and, finally, from the outer wall to any medium surrounding it. Heat is also transported away by the coolant media as the coolant temperature increases by the cooling. The hot gases may comprise a flame generated by a combustion of gases and/or fuel.

Accordingly, the engine wall structure is preferably a thrust nozzle wall, preferably of a rocket engine. The inner wall of such a nozzle has, primarily, a heat exchanging function, while the outer wall, primarily, has a load carrying function, the thickness of the inner wall being substantially less than the one of the outer wall.

According to prior art, thrust nozzle walls of rocket engines are constructed as a sandwich construction comprising an inner wall and an outer wall connected by webs that run in the lengthwise direction of the nozzle wall and delimit a plurality of ducts between the walls. The ducts are used as cooling ducts through which a cooling medium is permitted to flow. The cooling medium may comprise the engine fuel which is routed back to the combustion chamber after cooling, whereby the cooling is called regenerative cooling. On the other hand, the cooling medium might be a medium not primarily used for further purposes than cooling, whereby the cooling is called dump cooling. Also in this case the medium may comprise fuel, however not used for subsequent combustion.

Normally, the inner wall of the thrust nozzle mainly acts as a heat exchanger between the cooling medium and the hot gases on the inside of the inner wall, while the webs and the outer wall primarily has a load carrying function. Preferably the inner wall should have a relatively small thickness, for example in the range of 0.15-1.5 mm. Also, a variation as small as possible of the inner wall thickness is required, as variation in the thickness of the inner wall will result in varying stresses and strains of the inner wall and large functional variations of the inner wall temperature during operation.

According to prior art, as for example disclosed in U.S. Pat. No. 6,640,538, the inner wall, webs and ducts of a combustion chamber wall are produced by milling or electro eroding an inner sheet that will form the inner wall, such that open grooves are formed on the side thereof directed towards the outside or outer wall. Subsequently, a sheet forming the outer wall is applied onto the webs of the inner wall, thereby sealing and defining the ducts. Similar methods have been suggested for the production of thrust nozzle walls, however without any suggested use of electro-erosive processes for accomplishing the ducts.

However, connecting the outer wall to the inner wall may be rather cumbersome and costly. Moreover, especially if milling is used as the process for generating the ducts, or grooves, it will be difficult to achieve a required tolerance as to the thickness of the inner wall.

It is desirable to present a method of producing an engine wall structure as initially defined that is cost efficient in relation to methods of prior art.

It is also desirable to present a method of producing an engine wall structure as initially defined, by which it will be possible to achieve a very high tolerance as to the thickness of the inner wall. The method should also be well adapted for the purpose of producing such engine wall structures with ducts of rather complex cross-sectional shape, or ducts that, for example, get wider in the longitudinal direction thereof.

According to a method aspect of the present invention, the engine wall structure is produced by wire-electro discharge machining the duct out of a solid sheet forming the entire engine wall structure including the inner wall, the outer wall and the webs. Wire-electro discharge machining will hereinafter be referred to as wire-EDM According to an aspect, the wire used for the wire-EDM operation is introduced into the solid sheet from the side thereof forming the outer wall. Thereby, slits caused by the wire that need to be sealed are avoided at the inner wall surface.

According to a further aspect, after having cut out the duct, the wire used for the wire-EDM is guided out of the solid sheet via the same slit that was generated upon introduction of the wire into the sheet. Thereby, only one slit per produced duct will require sealing after the wire-EDM of the duct in question.

According to another aspect, the engine wall structure is to be provided with at least two adjacent ducts, and the wire used for the wire-EDM is introduced into the solid sheet in a region between said ducts up to a diverging junction from which it is guided to and used for cutting out a first of said ducts, subsequently guided back to said diverging junction, then guided to and used for cutting out the second one of said ducts, and finally guided out of the solid sheet via the diverging junction and a slit that was generated upon the introduction of the wire into the solid sheet. Thereby, only one slit will require sealing after the wire-EDM of the pair of ducts in question. Said diverging junction is sealed for preventing communication between the two adjacent ducts. Preferably, the diverging junction is sealed by a metal fusion process.

According to an alternative aspect, the wire used for the wire-EDM operation is introduced into the solid sheet along a first path and guided out of the sheet along a second path, said first and second paths ending in the created duct, thereby leaving a generally wedge-shaped body between the first and second paths, said body then being displaced in a direction towards the duct in order to fit in as a sealing means for sealing the slits generated in the solid sheet along the first and second paths, and finally connected to the wall in which it is fitted.

In order to perfectly counteract any cooling medium leakage due to a communication between the duct and the environment via the interface between the wedge-shaped body and the adjacent wall material, said interface is further sealed by means of a metal fusion process, preferably welding. That same metal fusion process could also be used for connecting the wedge-shaped body to the surrounding wall material.

Generally, according to the invention, the slit or slits generated in the solid sheet upon introduction or removal of the wire used for the wire-EDM should be sealed in order to inhibit any communication between the duct or ducts and the surrounding environment via said slit or slits, thereby preventing unwanted leakage of the cooling medium from the duct during operation.

Preferably, the slit or slits are sealed by a metal fusion process.

BRIEF DESCRIPTION OF THE DRAWINGS

Preferred embodiments of the present invention will now be described by way of example, with reference to the annexed drawings, on which.

DETAILED DESCRIPTION

Figure 1:
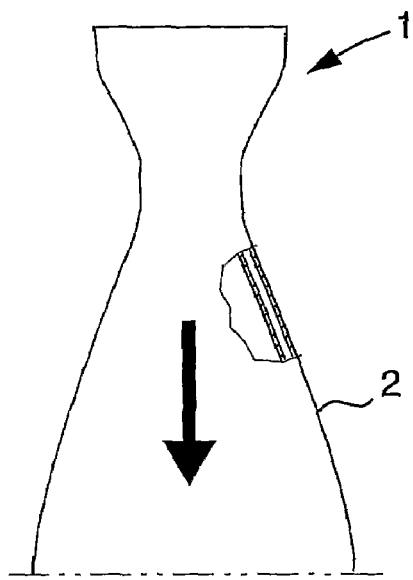
FIG. 1 shows a cross section of a nozzle provided with an engine wall structure according to the invention.
Figure 2:
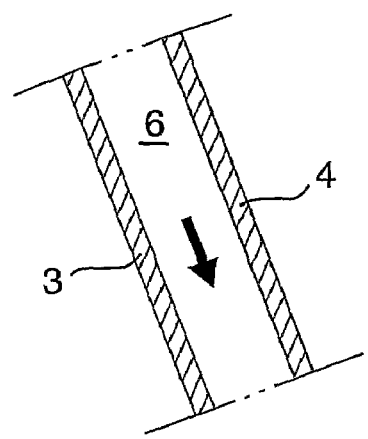
FIG. 2 is an enlargement of a segment of the engine wall structure according to FIG. 1.
Figure 3:
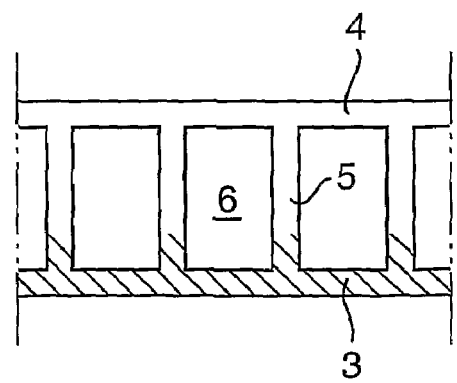
FIG. 3 is a schematic representation of a cross section of a part of an engine wall structure to be produced by the method of the invention.

FIGS. 1 and 2 are schematic representations of the thrust nozzle 1 of a rocket engine. The nozzle 1 comprises and is defined by a generally cone-shaped engine wall structure 2. The engine wall structure 2 is provided with an inner wall 3, preferably with a thickness of 0, 15-2 mm, and an outer wall 4, interconnected by a plurality of webs 5, as shown in FIG. 3. In the space between the inner wall 3 and the outer wall 4 there are ducts 6 that are used for cooling purposes. During operation of the engine a cooling medium, preferably the fuel or part of the fuel of the engine, is permitted to flow through the ducts 6 for the purpose of cooling the engine wall structure 2. This technique applies to satellite launchers and space planes, and also in satellite thrusters, nuclear reactors and high efficiency boilers, and it can also be applied to heat shields or to the nose cones of vehicles travelling at very high speed.

The webs 5 are elongated, extend mainly in the longitudinal direction of the nozzle 1, and act as intermediate walls between adjacent ducts 6. Preferably, the thickness of the webs 5 is constant along their longitudinal direction. Accordingly, since the nozzle 1 is cone-shaped, the width of the ducts 6 increases in the longitudinal direction, i.e. in the flame propagation direction of the engine to which the nozzle is associated.

According to the invention, the engine wall structure 2 is produced from one single work piece of solid material, out of which the ducts 6 are cut by means of a wire-EDM process. Preferably, the work piece out of which the ducts are cut comprises a solid sheet formed into or nearly into the final cone-shape of the nozzle 1 (normally, the final shape is somewhat bell-shaped and, accordingly, not exactly cone-shaped). In other words, the wire EDM process is performed on the cone-shaped piece, which is subsequently given a bell shape by means of an expansion of the cone shaped piece. A plurality of cone-shaped pieces could be interconnected in order to achieve the final bell-shaped nozzle.

Figure 4:
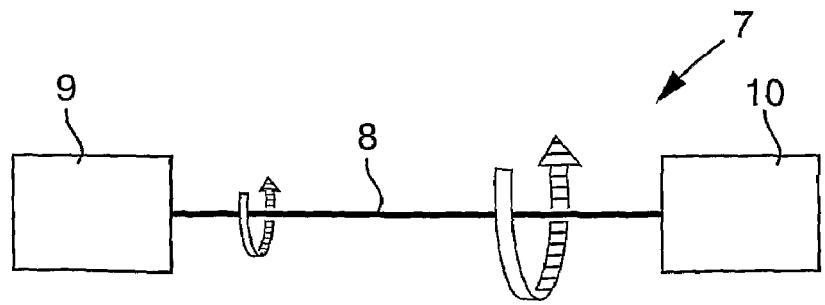
FIG. 4 is a schematic representation of a tool used for carrying out the method according to the invention.

In FIG. 4 there is shown a schematic representation of a tool 7 that may be used for the purpose of carrying out said wire-EDM process. The tool 7 comprises a wire 8, a first guide member 9 and a second guide member 10. The guide members are individually movable, in order to permit the generation of a duct 6 that has a varying cross-section area, as is preferred in the case of production of an engine wall structure 2 for cone shaped or nearly cone shaped nozzles. The individual mobility of the guide elements 9, 10 is represented by means of the arrows in FIG. 4.

Figure 5:
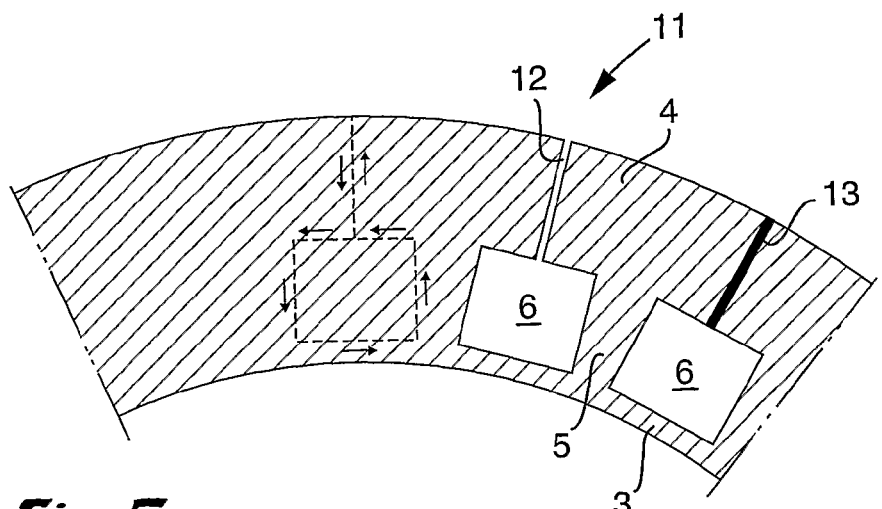
FIG. 5 shows a first embodiment of how to carry out the inventive method, and the duct and slits that result from the wire-EDM carried out in accordance with FIG. 5.

FIG. 5 gives a first example of how to carry out the method according to the invention. FIG. 5 shows a cross section of the engine wall structure 2 of the nozzle 1. The wire 8 of a wire-EDM tool is guided into the work piece 11 from an outer surface thereof, i.e. the outer surface of an outer wall 4 of the engine wall structure 2. A duct 6, in this case of rectangular shape, is cut out by means of the wire 8 in the interior of the work piece 11. The arrows in FIG. 5 show how the wire is guided along a closed loop in the work piece 11 in order to delimit said duct 6. After having cut out of the duct 6, the wire 8 is guided out of the work piece 11 through the same slit 12 as it generated while being introduced into the work piece 11. The piece of material remaining inside the closed loop defined by the wire 8 is pushed or pulled out of the work 11 piece from one of the ends of the cone-shaped engine wall structure 2, a longitudinal duct 6 extending along the whole length of the cone-wall thereby being defined. The method steps presented above are repeated for the generation of a plurality of ducts, as indicated in FIG. 5.

FIG. 5 also shows the remaining ducts 6 and slits 12 after carrying out the wire-EDM process, as well as the inner wall 3, the outer wall 4 and the webs 5. The slits 12 need to be sealed in order to prevent any leakage of cooling medium through any such slit 12 during operation of the engine in question. Preferably, the slits 12 are sealed by means of a metal fusion process such as soldering or welding. In this context it should be mentioned that the work piece or sheet 11 is made of metal, preferably copper, a copper alloy, steel or any nickel-based alloy such as INCONEL. A sealing weld 13 extending to a predetermined depth of a slit 11 is also shown in FIG. 6.

Figure 6:
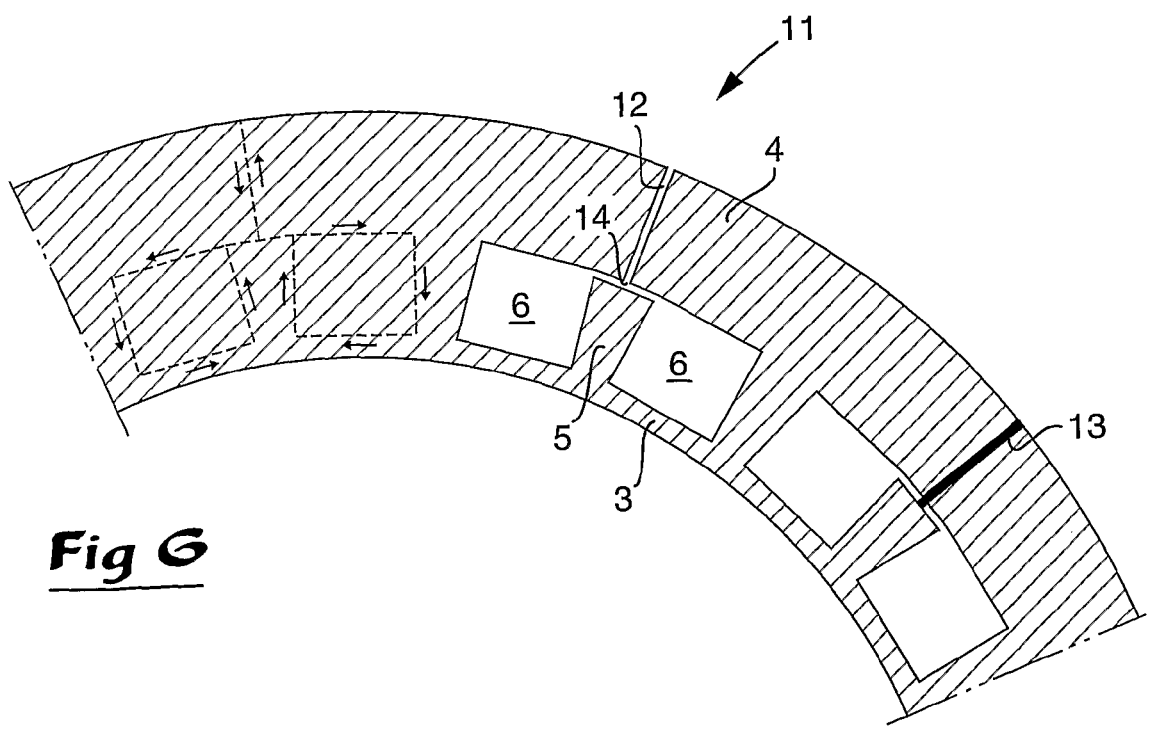
FIG. 6 shows a second embodiment of how to carry out the inventive method, and the duct and slits that result from the wire-EDM carried out in accordance with FIG. 6.
Figure 8:
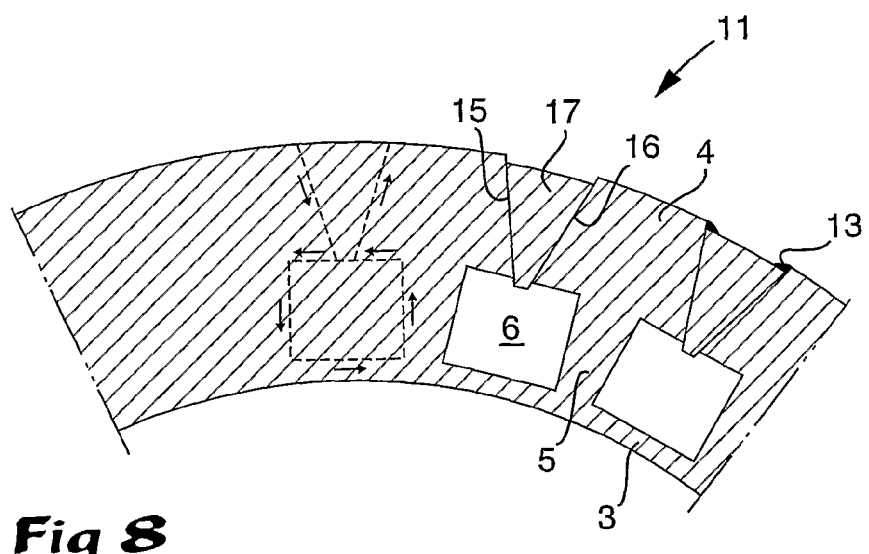
FIG. 8 shows a fourth embodiment of how to carry out the inventive method.

FIG. 6 shows an alternative way of carrying out the method according to the invention, in which the wire 8 is introduced into the work piece 11 in a region between two adjacent ducts 6 to be generated. From a certain intersection site or, in other words, along a certain intersection line or diverging junction 14 extending in the longitudinal direction of the wire 8 and the work piece 11, the wire 8 is guided to the region of a first duct 6 to be cut out and subsequently guided along a closed loop in order to cut out said duct 6. Then, preferably, the wire 8 is guided back to the diverging junction 14 through the same slit as it generated while being guided from the junction 14 to the region of the duct 6 to be generated. From the junction 14 the wire is the guided to the region of an adjacent duct 6 to be generated, guided along a closed loop in order to cut out that duct 6, then guided back to the junction 14 through the same slit as it generated when being guided from the junction 14 to the region of said adjacent duct to be generated, and, finally the wire 8 is guided out of the work piece 11 via the same slit 12 as it generated when being introduced into the work piece 11. The remaining ducts 6 and the slit 12 is shown in FIG. 8. Subsequently, the slit 12 is sealed by means of metal fusion process. The part of slit 12 generated between the adjacent ducts 6 should also be sealed in order to prevent communication between adjacent ducts 6. This can be achieved by letting the weld or soldering metal reach all the way down to the junction 14 or the region thereof.

Figure 7:
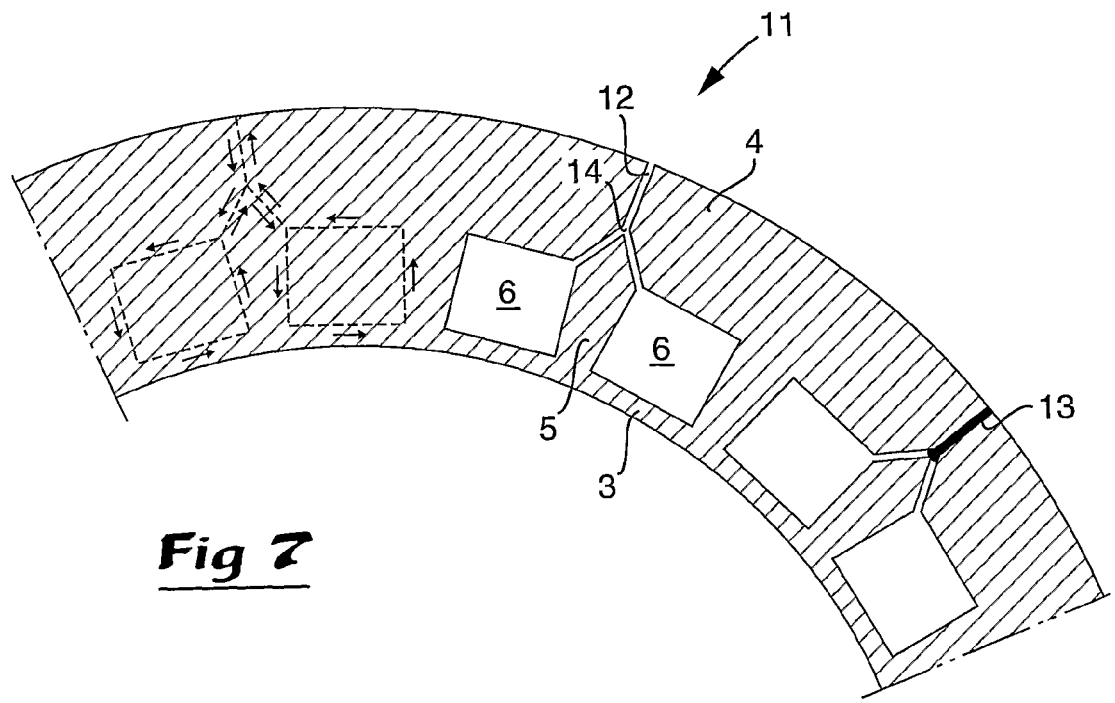
FIG. 7 shows a third embodiment of how to carry out the inventive method.

If, however, the thickness of the outer wall 4 is large, it might be difficult to reach down with a weld all the way to a junction located at the interface region between the webs 5 and the outer wall 4, as is the case in the embodiment shown in FIG. 6. FIG. 7 shows an alternative solution, by which the diverging junction 14 is located in the outer wall 4 in a region between the web 5 and the outer surface of the outer wall 4, preferably at a depth that permits a weld or a soldering joint to reach the junction 14 easily from the surface of the outer wall 4.

FIG. 8 shows a further embodiment of the method according to the present invention, by which the wire 8 is introduced into the work piece 11 along a first path 15 and guided out of the work piece 11 along a second path 16, said first and second paths 15, 16 ending in the duct 6 to be created, thereby leaving a body 17 between the first and second paths 15, 16 that tapers in a direction towards the duct 6 and that will form a part of the delimiting wall of said duct 6. Preferably, the body 17 has a wedge-shaped cross section. However, it could have other geometries, such as a U-shaped or circular cross section. Then, the body 17 is displaced in a direction towards the duct 6 in order to fit in as a sealing means for sealing the slits 11 generated in the solid sheet along the first and second paths 15, 16, and finally connected to the wall in which it is fitted, i.e. the generated outer wall 4. Preferably, a weld string or a solder string is applied along the borderlines between the body 17 and the surrounding wall 4 in the lengthwise direction of the latter, in order to seal and in order to connect the body 17 to the surrounding wall material.

It should be realised that the above description of the invention only has been made by way of example and that, of course, a person skilled in the art will recognise a plurality of alternative embodiments, all however within the scope of the invention as defined in the annexed patent claims, supported by the description and the drawings.

The invention claimed is:

1. A method of producing an engine wall structure that comprises an inner wall, to which hot gas is admitted during engine operation, an outer wall, which is colder than the inner wall during engine operation, and at least two webs that connect the inner wall with the outer wall and delimit a cooling duct between the walls, comprising producing the engine wall structure by wire-electro discharge machining the duct out of a solid sheet forming the entire engine wall structure including the inner wall, the outer wall and the webs, wherein a slit generated in the solid sheet upon introduction or removal of the wire used for the wire-electro discharge machining is sealed.

2. A method according to claim 1, wherein the wire used for the wire-electro discharge machining operation is introduced into the solid sheet from the side thereof forming the outer wall.

3. A method according to claim 1, wherein, after having cut out the duct, the wire used for the wire electro discharge machining is guided out of the solid sheet via a slit generated upon introduction of the wire into the sheet.

4. A method of producing an engine wall structure that comprises an inner wall, to which hot gas is admitted during engine operation, an outer wall, which is colder than the inner wall during engine operation, and at least two webs that connect the inner wall with the outer wall and delimit a cooling duct between the walls, comprising producing the engine wall structure by wire-electro discharge machining the duct out of a solid sheet forming the entire engine wall structure including the inner wall, the outer wall and the webs, wherein the engine wall structure is to be provided with at least two adjacent ducts, and that the wire used for the wire-electro discharge machining is introduced into the solid sheet in a region between the ducts up to a diverging junction from which it is, guided to and used for cutting out a first of the ducts, subsequently guided back to the diverging junction, then guided to and used for cutting out the second one of the ducts, and finally guided out of the solid sheet via the diverging junction and a slit that was generated upon the introduction of the wire into the solid sheet.

5. A method of producing an engine wall structure that comprises an inner wall, to which hot gas is admitted during engine operation, an outer wall, which is colder than the inner wall during engine operation, and at least two webs that connect the inner wall with the outer wall and delimit a cooling duct between the walls, comprising producing the engine wall structure by wire-electro discharge machining the duct out of a solid sheet forming the entire engine wall structure including the inner wall, the outer wall and the webs, wherein the wire used for the wire-electro discharge machining operation is introduced into the solid sheet along a first path and guided out of the sheet along a second path, the first and second paths ending in the created duct, thereby leaving a body between the first and second paths that tapers in a direction towards the duct, the body then being displaced in a direction toward the duct in order to fit in as a sealing means for sealing the slits generated in the solid sheet along the first and second paths, and finally connected to the wall in which it is fitted.

6. A method according to claim 5, wherein the interface between the wedge-shaped body and the adjacent wall material is further sealed by means of a metal fusion process.

7. A method according to claim 4, wherein a slit generated in the solid sheet upon introduction or removal of the wire used for the wire-electro discharge machining is sealed.

8. A method according to claim 1, wherein the slit is sealed by a metal fusion process.

9. A method, according to claim 4, wherein the diverging junction is sealed for preventing communication between the two adjacent ducts.

10. A method according to claim 9, wherein the diverging junction is sealed by a metal fusion process.

11. A method according to claim 5, wherein, after having cut out the duct, the wire used for the wire electro discharge machining is guided out of the solid sheet via a slit generated upon introduction of the wire into the sheet.

12. A method according to claim 2, wherein the engine wall structure is to be provided with at least two adjacent ducts, and that the wire used for the wire-electro discharge machining is introduced into the solid sheet in a region between the ducts up to a diverging junction from which it is guided to and used for cutting out a first of the ducts, subsequently guided back to the diverging junction, then guided to and used for cutting out the second one of the ducts, and finally guided out of the solid sheet via the diverging junction and a slit that was generated upon the introduction of the wire into the solid sheet.

13. A method according to claim 4, wherein the wire used for the wire-electro discharge machining operation is introduced into the solid sheet along a first path and guided out of the sheet along a second path, the first and second paths ending in the created duct, thereby leaving a body between the first and second paths that tapers in a direction towards the duct, the body then being displaced in a direction toward the duct in order to fit in as a sealing means for sealing the slits generated in the solid sheet along the first and second paths, and finally connected to the wall in which it is fitted.

14. A method according to claim 13, wherein the interface between the wedge-shaped body and the adjacent wall material is further sealed by means of a metal fusion process.

15. A method according to claim 5, wherein a slit generated in the solid sheet upon introduction or removal of the wire used for the wire-electro discharge machining is sealed.

16. A method according to claim 15, wherein the slit is sealed by a metal fusion process.

17. A method according to claim 12, wherein the diverging junction is sealed for preventing communication between the two adjacent ducts.

18. A method according to claim 17, wherein the diverging junction is sealed by a metal fusion process.

* * * * *